P. J. A. SCHNOOR.
VEHICLE JACK.
APPLICATION FILED JUNE 27, 1914.
1,134,233.
Patented Apr. 6, 1915.
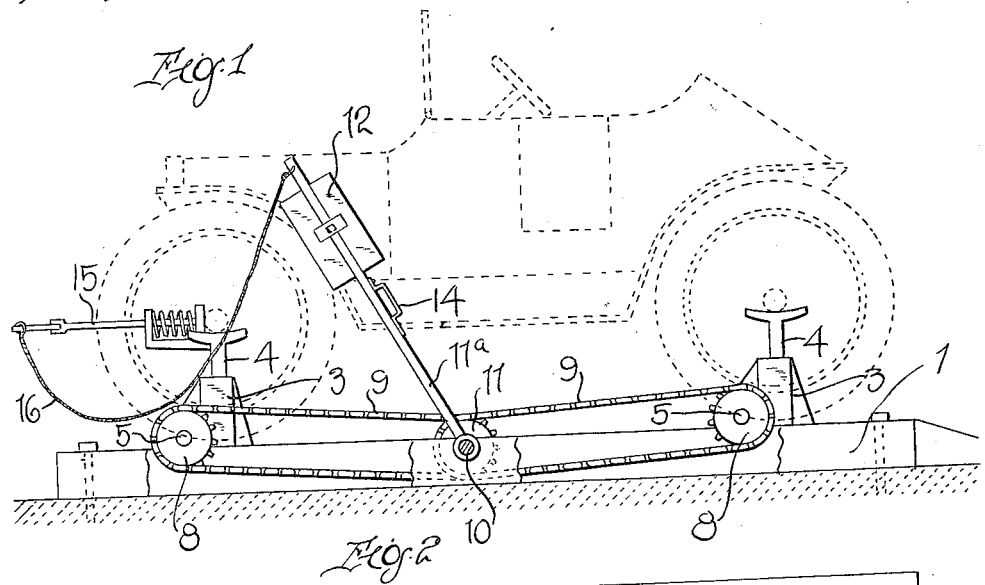
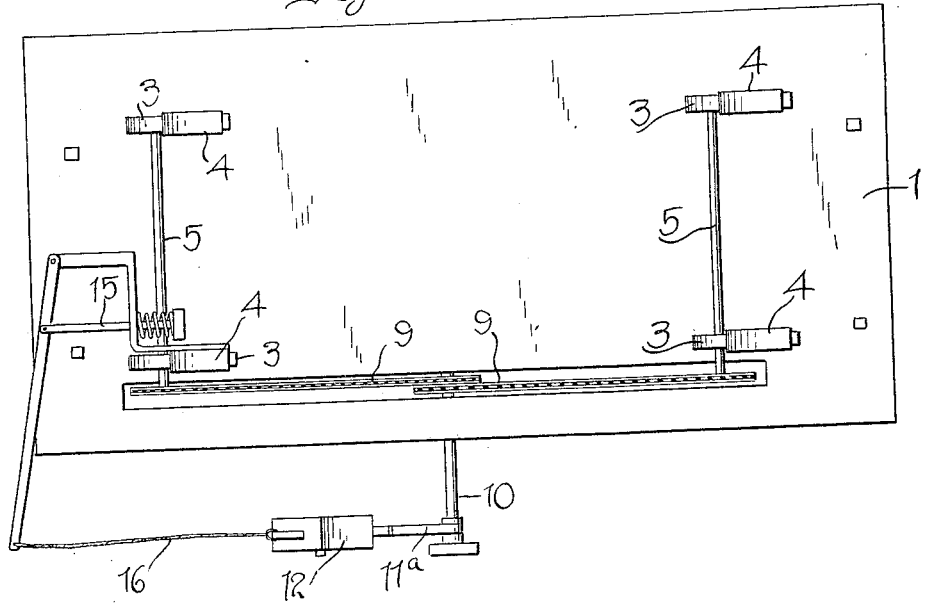
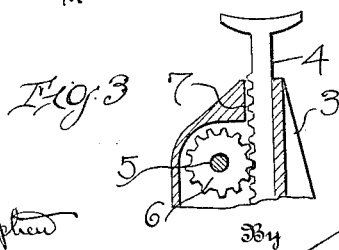
Witnesses
Robert M. Sutphen
A. J. Hind.
Inventor
P. J. A. Schnoor
By Watson E. Coleman
Attorney

UNITED STATES PATENT OFFICE.

PETER J. A. SCHNOOR, OF HOLSTEIN, IOWA, ASSIGNOR OF ONE-HALF TO CHARLEY ADAMS, OF HOLSTEIN, IOWA.

VEHICLE-JACK.

1,134,233.   Specification of Letters Patent.   Patented Apr. 6, 1915.

Application filed June 27, 1914. Serial No. 847,704.

*To all whom it may concern:*

Be it known that I, PETER J. A. SCHNOOR, a citizen of the United States, residing at Holstein, in the county of Ida and State of Iowa, have invented certain new and useful Improvements in Vehicle-Jacks, of which the following is a specification, reference being had to the accompanying drawings.

This invention relates to certain improvements in vehicle jacks, and an object of the invention is to provide a device of this general character having novel and improved means whereby a vehicle may be raised so as to remove the weight of the same from its wheels with convenience and facility.

Furthermore, it is an object of the invention to provide a device of this general character having novel and improved means whereby the vehicle, such as an automobile, will automatically operate the jack to engage the vehicle and lift the same so as to remove the weight of the vehicle from the wheels.

The invention consists in the details of construction and in the combination and arrangement of the several parts of my improved vehicle jack, whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be better understood, I will now proceed to describe the same with reference to the accompanying drawings, wherein Figure 1 is a side elevational view, with a part in section, of a vehicle jack constructed in accordance with my invention, a vehicle being indicated by dotted lines in applied position and the operating means being shown in released adjustment; Fig. 2 is a top plan view of the device as disclosed in Fig. 1; and Fig. 3 is a fragmentary detail view, partly in elevation and partly in section, of one of the jack members herein embodied.

As disclosed in the accompanying drawings, 1 denotes a hollow base member, preferably formed of steel, adapted to be suitably anchored to a foundation 2, preferably of concrete, as is generally employed in garages or the like. Projecting upwardly from the base 1 adjacent the opposite extremities thereof are the spaced guide brackets 3 in which are slidably mounted for vertical movement the jacks 4 adapted to engage the front and rear axles of a vehicle, such as an automobile, in a manner which is believed to be self-evident, in order that such vehicle may be elevated in order to remove the weight thereof from its supporting wheels. Disposed transversely of the base 1 forwardly of each series of spaced guiding brackets 3 is a shaft 5 provided with suitable gear wheels 6 adapted to mesh with the rack edge 7 of an adjacent jack 4. The shafts 5 have suitably secured thereto the sprocket wheels 8, around which are directed the sprocket chains 9 which in turn are directed around the sprockets 11 fixed to the counter-shaft 10 disposed in a plane transversely of the base 1, as is believed to be clearly shown in the accompanying drawings. By this arrangement, it will be readily perceived that upon axial rotation or rocking movement being imparted to the shaft 10, the jacks 4 will be caused to move simultaneously in the same general direction.

Fixed to the shaft 10 is the lever 11ª which maintains substantially a vertical position when the jacks 4 are in their lowermost positions and adjustably secured to the upper or free extremities of the lever 11 is the weighted member 12 which is adapted, when the lever is offset from its vertical position, to overbalance the weight of the vehicle upon the jacks 4 and thus raise the same. In order to facilitate the return of the lever 11 to the vertical position, I suitably secure thereto at any predetermined point, the hand grasp member 14.

In order that my improved device may operate in an automatic manner, I mount upon one of the forward jacks 4 for movement in a horizontal plane, the spring controlled plunger 15 operatively connected with the lever 11ª through a suitably guided flexible member 16. The plunger 15 is so positioned relative to the forward jack 4, to which it is connected, as to be engaged by the forward axle of the vehicle when the vehicle has been properly advanced above the jacks, as is believed to be self-evident, and it will be observed that the initial contact of the front axle of the vehicle with the plunger 15 will cause the lever 11 to be thrown from its vertical position and thus permit the jacks to be elevated under the influence of the weight 12 carried thereby.

From the foregoing description, it is thought to be obvious that a vehicle jack constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A device of the character described comprising a base, a plurality of vertically adjustable elements carried by the base for engagement with the axles of a vehicle, a shaft rotatably supported by the base, an operative connection between the shaft and the vertically adjustable elements whereby movement of the shaft in one direction will impart upward movement to the elements, a weighted rock arm carried by the shaft and normally disposed in substantially a vertical position, and means under control of the vehicle to be lifted for throwing the weighted rock arm off of its normal position whereby said rack arm will cause the vertically adjustable elements to move upwardly.

2. A device of the character described comprising a base, a plurality of vertically adjustable elements carried by the base for engagement with the axles of a vehicle, a shaft rotatably supported by the base, an operative connection between the shaft and the vertically adjustable elements whereby movement of the shaft in one direction will impart upward movement to the elements, a weighted rock arm carried by the shaft and normally disposed in substantially a vertical position, a movable device positioned adjacent certain of the elements and adapted to be engaged by the front axle of the vehicle, such engagement between the front axle and the device causing movement of the device in one direction, and a flexible connection between the device and the weighted rock arm whereby the movement of the device throws the weighted rock arm from its normal position.

3. A device of the character described comprising a base, a plurality of vertically disposed elements carried by the base for engagement with the axles of a vehicle, a plunger carried by one of the elements and adapted to be engaged by an axle of the vehicle, a shaft, operative connections between the shaft and the vertically adjustable elements whereby movement of the shaft in one direction causes a simultaneous upward movement of the elements, a weighted rock arm carried by the shaft and normally disposed in substantially a vertical position, and an operative connection between the plunger and the rock arm whereby the movement of the plunger under the influence of the axle of the vehicle serves to throw the rock arm from its normal position whereby the elements are automatically caused to move upwardly under the influence of the weighted arm.

In testimony whereof I hereunto affix my signature in the presence of two witnesses.

PETER J. A. SCHNOOR.

Witnesses:
 M. C. HANSEN,
 CHAS. KASTNER.

Copies of this patent may be obtained for five cents each, by addressing the "Commissioner of Patents, Washington, D. C."